(12) United States Patent
Smith

(10) Patent No.: US 10,830,306 B2
(45) Date of Patent: Nov. 10, 2020

(54) JOUNCE BUMPER ASSEMBLIES AS WELL AS GAS SPRING ASSEMBLIES INCLUDING SAME

(71) Applicant: Firestone Industrial Products Company, LLC, Nashville, TN (US)

(72) Inventor: Jason B. Smith, Fairview, TN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 0 days.

(21) Appl. No.: 15/849,182

(22) Filed: Dec. 20, 2017

(65) Prior Publication Data

US 2018/0187740 A1    Jul. 5, 2018

Related U.S. Application Data

(60) Provisional application No. 62/440,572, filed on Dec. 30, 2016.

(51) Int. Cl.
| | |
|---|---|
| *F16F 9/00* | (2006.01) |
| *F16F 9/58* | (2006.01) |
| *B60G 15/08* | (2006.01) |
| *F16F 9/05* | (2006.01) |
| *B60G 11/62* | (2006.01) |

(52) U.S. Cl.
CPC .............. *F16F 9/58* (2013.01); *B60G 11/62* (2013.01); *B60G 15/08* (2013.01); *F16F 9/052* (2013.01); *B60G 2202/143* (2013.01); *B60G 2202/152* (2013.01); *B60G 2204/4502* (2013.01); *F16F 2236/04* (2013.01)

(58) Field of Classification Search
CPC .............. B60G 11/27; F16F 9/05; F16F 9/052
USPC ......................................... 267/139, 140, 116
See application file for complete search history.

(56) References Cited

U.S. PATENT DOCUMENTS

| | | | | |
|---|---|---|---|---|
| 5,201,500 | A * | 4/1993 | Ecktman | B60G 7/04 267/140 |
| 6,076,794 | A * | 6/2000 | Pradel | B60G 13/003 248/636 |
| 6,109,598 | A | 8/2000 | Hilburger | |
| 6,113,081 | A | 9/2000 | Hilburger | |
| 7,641,182 | B2 | 1/2010 | Leonard | |
| 9,140,327 | B2 | 9/2015 | Hart | |
| 2002/0063369 | A1 * | 5/2002 | Huang | F16F 1/3732 267/153 |
| 2005/0012256 | A1 * | 1/2005 | Huprikar | B60G 13/003 267/141 |

(Continued)

*Primary Examiner* — Nicholas J Lane

(57) ABSTRACT

A jounce bumper assembly dimensioned for securement on or along an associated end member of an associated gas spring assembly. The jounce bumper assembly includes a bumper mount dimensioned for securement to the associated end member. A jounce bumper supported on the bumper mount for axial displacement therealong. A biasing element is disposed peripherally about the bumper mount and positioned axially between the jounce bumper and the associated end member. The biasing element has a fully-compressed, solid height that is operative to maintain the jounce bumper assembly in axially-spaced relation to the associated end member under a full jounce load condition. Gas spring assemblies including such a jounce bumper assembly, and suspension systems including one or more of such gas spring assemblies are also included.

20 Claims, 13 Drawing Sheets

(56) References Cited

U.S. PATENT DOCUMENTS

| | | | |
|---|---|---|---|
| 2006/0043659 A1* | 3/2006 | Gofron | B60G 7/04 267/220 |
| 2007/0017761 A1* | 1/2007 | Huprikar | B60G 7/04 188/321.11 |
| 2008/0012188 A1* | 1/2008 | Dickson | F16F 1/3732 267/139 |
| 2010/0230877 A1* | 9/2010 | Schudt | F16F 1/377 267/220 |
| 2014/0061984 A1* | 3/2014 | Hart | B60G 11/28 267/64.27 |
| 2015/0239315 A1* | 8/2015 | Al-Dahhan | F16F 1/377 280/124.177 |

* cited by examiner

JOUNCE BUMPER ASSEMBLIES AS WELL AS GAS SPRING ASSEMBLIES INCLUDING SAME

This application claims the benefit of priority from U.S. Provisional Patent Application No. 62/440,572, filed on Dec. 30, 2016, the subject matter of which is hereby incorporated herein by reference in its entirety.

BACKGROUND

The subject matter of the present disclosure broadly relates to the art of gas spring devices and, more particularly, to progressive spring rate jounce bumper assemblies that are operative to provide a first spring rate during an initial range of deflection and at least a second, increased spring rate upon displacement beyond the initial range of deflection. Gas spring assemblies including such jounce bumper assemblies as well as suspension systems that include one or more of such gas spring assemblies are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies and/or suspension systems of non-wheeled vehicles, support structures, height adjusting systems and actuators associated with industrial machinery, components thereof and/or other such equipment. Accordingly, the subject matter of the present disclosure is not intended to be limited to use associated with gas spring suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Generally, the range of motion of a suspension system extends between a first or fully compressed condition and a second or fully extended condition. To eliminate contact between opposing portions of the sprung and unsprung masses, contact between opposing portions of components of the suspension system or contact between any combination thereof, jounce bumpers are commonly installed on one or more portions of the vehicle to prevent such opposing portions from directly impacting one another. Thus, during jounce motion of the suspension system, an opposing component will contact the jounce bumper rather than impacting components on or near which the jounce bumper is mounted.

Jounce bumpers of a variety of types, kinds and configurations have been developed and are commonly used. Though the size and shape of jounce bumpers vary widely, known jounce bumpers can generally be grouped into two categories, namely, compliant jounce bumpers and rigid jounce bumpers. The former are commonly formed from materials capable of relatively high deflections under load, and are often formed from rubber or elastomeric foam compounds.

Generally, compliant jounce bumpers act to cushion or otherwise soften the impact that would otherwise be associated with a sudden movement toward a full jounce condition. As such, compliant jounce bumpers are well suited for use in relatively light duty applications, such as use in the suspension systems of passenger vehicles and light trucks, for example, where ride comfort is a more significant factor. Additionally, the materials from which such compliant jounce bumpers are formed is normally capable of withstanding at least some amount of lateral deflection, such as would be due to a laterally-applied load, without undergoing permanent deformation or another undesirable alteration of its performance characteristics. Furthermore, suspension systems used in passenger and other light-duty applications typically permit a relatively small or otherwise reduced amount of lateral displacement, which is normally well within the capability of known compliant jounce bumpers to withstand.

Unfortunately, the elastomeric materials that result in compliant jounce bumpers being so well suited for high-comfort, light-duty applications have generally been found to be poorly suited for high-load and/or heavy-duty applications. One exemplary reason for such a lack of suitability for use in heavy-duty applications relates to the elastomeric nature of the material itself. More specifically, for a given compliant jounce bumper to have a suitable compressed height (i.e., a compressed height that will be sufficient to inhibit contact between opposing suspension components under a heavy load), the corresponding free height of such a given compliant jounce bumper would likely be great enough to adversely affect the overall travel or other performance characteristics of the suspension system. Said differently, the elastomeric material would have to compress so much to support the high-load condition that the unloaded height of the material could result in the compliant jounce bumper undesirably interfering with the performance of the suspension system or components thereof.

Oppositely, rigid jounce bumpers are commonly formed from materials that deflect a relatively small amount under load, such as high strength and/or fiber reinforced plastic materials, for example. Rigid jounce bumpers are not normally considered to be well suited for use in light duty applications (e.g., passenger vehicle applications) because of the minimal deflection and corresponding ride harshness that is associated with the use of such jounce bumpers. However, rigid jounce bumpers are well suited for heavy duty applications, such as in truck, tractor-trailer and other over-the-road vehicle applications, for example, where it is desirable to provide a sacrificial component that can prevent impacts between more permanent and/or expensive components. Additionally, it is often desirable to lower trucks, trailers or other vehicle bodies onto the jounce bumpers to provide a solid foundation for loading and/or unloading of the vehicle body.

Notwithstanding the common use and overall success of known jounce bumper constructions as well as gas spring assemblies that utilize the same, it is believed desirable to develop jounce bumper assemblies that are operative to provide a combination of performance characteristics that are often otherwise associated with either rigid or compliant jounce bumpers but typically unavailable in both of such components and thereby providing improved performance and/or other characteristics, and/or overcoming the foregoing and/or other disadvantages of known constructions, and/or otherwise advancing the art of gas spring devices.

BRIEF SUMMARY

One example of a jounce bumper assembly in accordance with the subject matter of the present disclosure can be dimensioned for securement on or along an associated end member of an associated gas spring assembly. The jounce bumper assembly can include a bumper mount dimensioned for securement to the associated end member. A jounce bumper can be supported on the bumper mount for axial displacement therealong. A biasing element can be disposed peripherally about the bumper mount and positioned axially between the jounce bumper and the associated end member. The biasing element can have a fully-compressed, solid height that is operative to maintain the jounce bumper assembly in axially-spaced relation to the associated end member under a full jounce load condition.

One example of a gas spring assembly in accordance with the subject matter of the present disclosure can include a flexible spring member, a first end member, a second end member and a jounce bumper assembly. The flexible spring member can have a longitudinal axis and can include a flexible wall extending peripherally about the longitudinal axis. The flexible spring member can extend longitudinally between opposing first and second ends and can at least partially define a spring chamber therebetween. The first end member can be secured across the first end of the flexible spring member such that a substantially fluid-tight seal is formed therebetween, and the second end member can be secured across the second end of the flexible spring member such that a substantially fluid-tight seal is formed therebetween. The jounce bumper assembly can be disposed within the spring chamber and can be secured to one of the first and second end members such that the jounce bumper is dimensioned to abuttingly engage the other of the first and second end members during use of the gas spring assembly under jounce load conditions. The jounce bumper assembly can include a bumper mount dimensioned for securement to the one of the first and second end members and a jounce bumper supported on the bumper mount for axial displacement therealong. The jounce bumper assembly can also include a biasing element disposed peripherally about the bumper mount and positioned axially between the jounce bumper and the one of the first and second end members. The biasing element can have a fully-compressed, solid height that is operative to maintain the jounce bumper assembly in axially-spaced relation to the one of the first and second end members under a full jounce load condition.

Another example of a gas spring assembly in accordance with the subject matter of the present disclosure can include a flexible spring member having a longitudinal axis and including a flexible wall extending peripherally about the longitudinal axis. The flexible spring member can extend longitudinally between opposing first and second ends and can at least partially defining a spring chamber therebetween. A first end member can be secured across the first end of the flexible spring member such that a substantially fluid-tight seal is formed therebetween. A second end member can be secured across the second end of the flexible spring member such that a substantially fluid-tight seal is formed therebetween. A jounce bumper assembly can be disposed within the spring chamber and can be secured to one of the first and second end members such that the jounce bumper is dimensioned to abuttingly engage the other of the first and second end members during use of the gas spring assembly under jounce load conditions. The jounce bumper assembly can include a bumper mount secured to the one of the first and second end members. The bumper mount can extend axially between a proximal end and a distal end and can have an outer cross-sectional dimension. The bumper mount can include a bumper retaining feature disposed therealong between the proximal and distal ends. The bumper retaining feature can extend radially into the bumper mount such that the bumper retaining feature has a retaining feature cross-sectional dimension that is less than the outer cross-sectional dimension of the bumper mount with the bumper retaining feature having a length that is at least 75 percent of the retaining feature cross-sectional dimension. A jounce bumper can be supported on the bumper mount for axial displacement therealong. The jounce bumper can include an outer side wall portion and an inner side wall portion disposed radially inward of the outer side wall portion that at least partially defines a passage into the jounce bumper. The jounce bumper can also include an end surface oriented in facing relation to the one of the first and second end members. A plurality of retaining projections can extend radially inward into the passage from along the inner side wall portion with the plurality of retaining projections extending into the bumper retaining feature and operatively engaging the bumper mount in a first radially-biased condition such that the jounce bumper is displaceable toward the one of the first and second end members while the plurality of retaining projections remain in approximately the first radially-biased condition during displacement along the length of the bumper retaining feature. A biasing element can be disposed peripherally about the bumper mount and positioned axially between the jounce bumper and the one of the first and second end members. The biasing element can have a fully-compressed, solid height that is operative to maintain the jounce bumper assembly in axially-spaced relation to the one of the first and second end members under a full jounce load condition.

One example of a suspension system in accordance with the subject matter of the present disclosure can include a pressurized gas system that includes a pressurized gas source and a control device. The suspension system can also include at least one gas spring assembly according to either one of the two foregoing paragraphs. The at least one gas sprig assembly can be disposed in fluid communication with the pressurized gas source through the control device such that pressurized gas can be selectively transferred into and out of the spring chamber.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
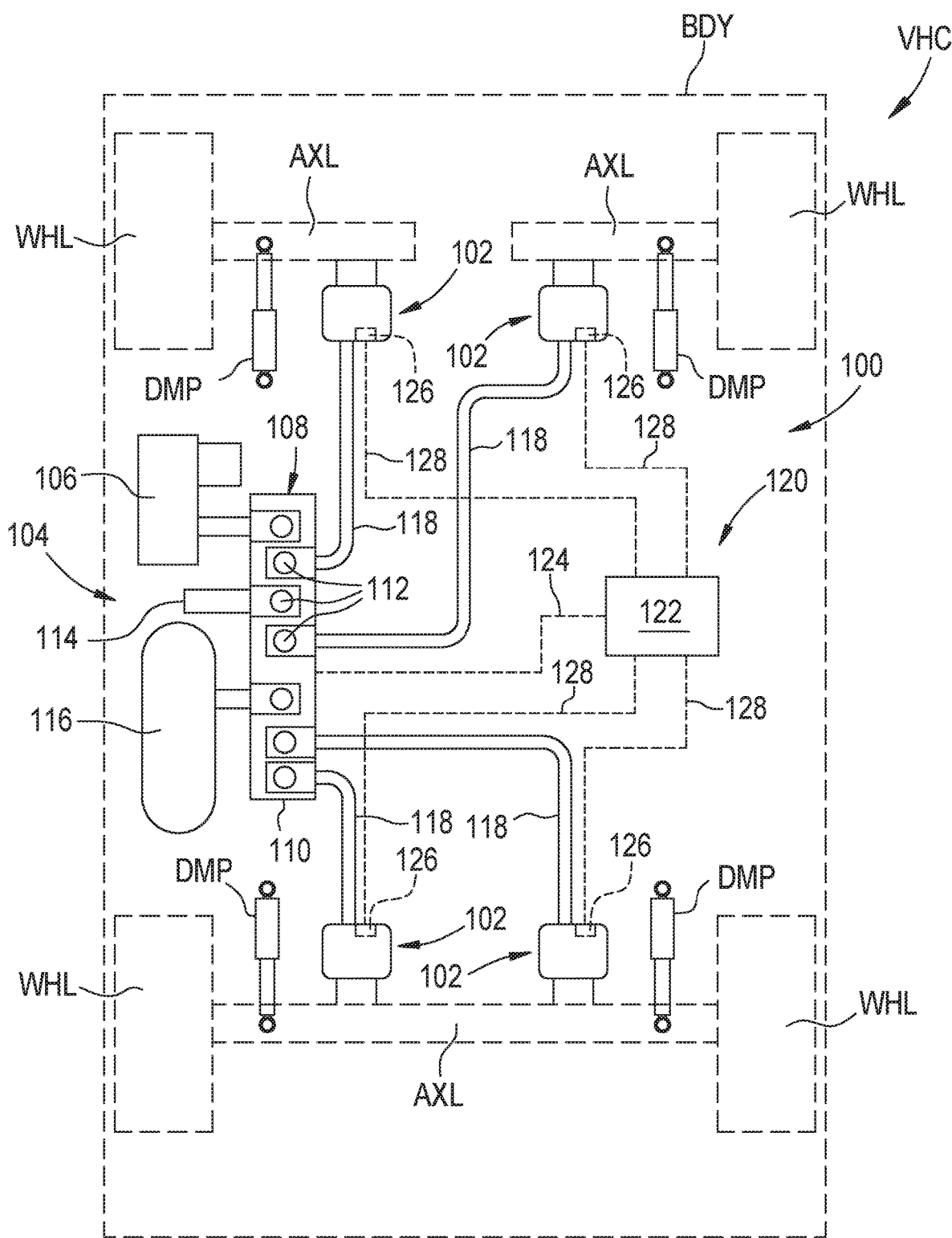
FIG. 1 is a schematic representation of one example of a suspension system that includes a plurality of gas spring assemblies in accordance with the subject matter of the present disclosure.
Figure 2:
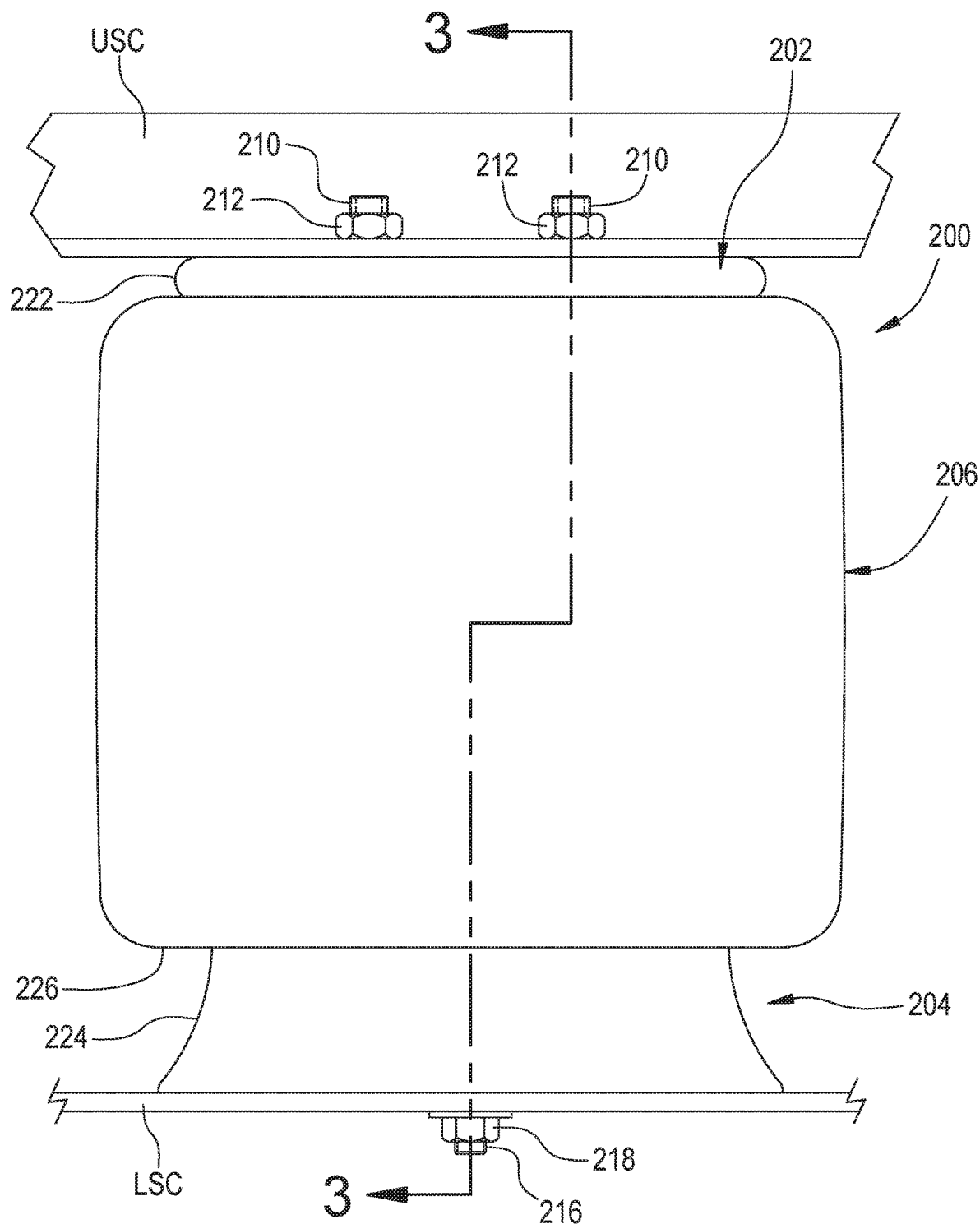
FIG. 2 is a side elevation view of one example of a gas spring assembly in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner. Additionally, it will be appreciated that such a suspension system of the vehicle can, optionally, include a plurality of damping members, such as dampers DMP, for example, and that any such damping members can also be operatively connected between the sprung and unsprung masses of the associated vehicle in any suitable manner.

The suspension system can also include a plurality of gas spring assemblies supported between the sprung and unsprung masses of the associated vehicle. In the arrangement shown in FIG. 1, suspension system 100 includes four gas spring assemblies 102, one of which is disposed toward each corner of the associated vehicle adjacent a corresponding wheel WHL. However, it will be appreciated that any other suitable number of gas spring assemblies could alternately be used in any other configuration or arrangement. As shown in FIG. 1, gas spring assemblies 102 are supported between axles AXL and body BDY of associated vehicle VHC. Additionally, it will be recognized that the gas spring assemblies shown and described in FIG. 1 (e.g., gas spring assemblies 102) are illustrated as being of a rolling lobe-type construction. It is to be understood, however, that gas spring assemblies of other types, kinds and/or constructions could alternately be used.

Suspension system 100 also includes a pressurized gas system 104 operatively associated with the gas spring assemblies for selectively supplying pressurized gas (e.g., air) thereto and selectively transferring pressurized gas therefrom. In the exemplary embodiment shown in FIG. 1, pressurized gas system 104 includes a pressurized gas source, such as a compressor 106, for example, for generating pressurized air or other gases. A control device, such as a valve assembly 108, for example, is shown as being in communication with compressor 106 and can be of any suitable configuration or arrangement. In the exemplary embodiment shown, valve assembly 108 includes a valve block 110 with a plurality of valves 112 supported thereon. Valve assembly 108 can also optionally include a suitable exhaust, such as a muffler 114, for example, for venting pressurized gas from the system. Optionally, pressurized gas system 104 can also include a reservoir 116 in fluid communication with the compressor and/or valve assembly 108 and suitable for storing pressurized gas, such as storing pressurized gas at a pressure level greater than atmospheric pressure for an extended period of time (e.g., minutes, hours, days, weeks or months).

Valve assembly 108 can be in fluid communication with gas spring assemblies 102 in any suitable manner, such as through suitable gas transfer lines 118, for example. As such, pressurized gas can be selectively transferred into and/or out of the gas spring assemblies through valve assembly 108 by selectively operating valves 112, such as to alter or maintain vehicle height at one or more corners of the vehicle, for example.

Suspension system 100 can also include a control system 120 that is capable of communication with any one or more systems and/or components (not shown) of vehicle VHC and/or suspension system 100, such as for selective operation and/or control thereof. Control system 120 can include a controller or electronic control unit (ECU) 122 communicatively coupled with compressor 106 and/or valve assembly 108, such as through a conductor or lead 124, for example, for selective operation and control thereof, which can include supplying and exhausting pressurized gas to and/or from gas spring assemblies 102. Controller 122 can be of any suitable type, kind and/or configuration.

Control system 120 can also, optionally, include one or more height (or distance) sensing devices 126, such as, for example, may be operatively associated with the gas spring assemblies and capable of outputting or otherwise generating data, signals and/or other communications having a relation to a height of the gas spring assemblies or a distance between other components of the vehicle. Height sensing devices 126 can be in communication with ECU 122, which can receive the height or distance signals therefrom. The height sensing devices can be in communication with ECU 122 in any suitable manner, such as through conductors or leads 128, for example. Additionally, it will be appreciated that the height sensing devices can be of any suitable type, kind and/or construction.

One example of a gas spring assembly 200 in accordance with the subject matter of the present disclosure, such as may be suitable for use as one of gas spring assemblies 102 in FIG. 1, for example, is shown in FIGS. 2-5 as having a longitudinally-extending axis AX (FIG. 3) and can include one or more end members, such as, for example, an end member 202 and an end member 204 that is spaced longitudinally from end member 202. A flexible spring member 206 can extend peripherally around axis AX and can be secured between the end members in a substantially fluid-tight manner such that a spring chamber 208 (FIG. 3) is at least partially defined therebetween.

Gas spring assembly 200 can be disposed between associated sprung and unsprung masses of an associated vehicle in any suitable manner. For example, one end member can be operatively connected to the associated sprung mass with the other end member disposed toward and operatively connected to the associated unsprung mass. In the embodiment shown in FIGS. 2 and 3, for example, end member 202 is secured along a first or upper structural component USC, such as associated vehicle body BDY in FIG. 1, for example, and can be secured thereon in any suitable manner. For example, one or more securement devices, such as mounting studs 210, for example, can be included along end member 202. In some cases, the one or more securement devices (e.g., mounting studs 210) can project outwardly from end member 202 and can be secured thereon in a suitable manner, such as, for example, by way of a flowed-material joint (not shown) or a press-fit connection (not identified). Additionally, such one or more securement devices can extend through mounting holes HLS in upper structural component USC and receive one or more threaded nuts 212 or other securement devices, for example. As an alternative to one or more of mounting studs 210, one or more threaded passages (e.g., blind passages and/or through passages) could be used in conjunction with a corresponding number of one or more threaded fasteners.

Additionally, a fluid communication port, such as a transfer passage 214 (FIG. 3), for example, can optionally be provided to permit fluid communication with spring chamber 208, such as may be used for transferring pressurized gas into and/or out of the spring chamber, for example. In the exemplary embodiment shown, transfer passage 214 extends through at least one of mounting studs 210 and is in fluid communication with spring chamber 208. It will be appreciated, however, that any other suitable fluid communication arrangement could alternately be used.

End member 204 can be secured along a second or lower structural component LSC, such as an axle AXL in FIG. 1, for example, in any suitable manner. As one example, lower structural component LSC could include one or more mounting holes HLS extending therethrough. In such case, a mounting stud 216 could be operatively connected to end member 204 and/or another component of the gas spring assembly, and could extend through one of mounting holes HLS, such as to receive a corresponding threaded nut 218, for example.

It will be appreciated that the one or more end members can be of any suitable type, kind, construction and/or configuration, and can be operatively connected or otherwise secured to the flexible wall in any suitable manner. In the exemplary arrangement shown in FIGS. 2 and 3, for example, end member 202 is of a type commonly referred to as a bead plate that is secured to a first end 220 of flexible spring member 206, such as by crimping or otherwise deforming an outer peripheral portion 222 of end member 202 to form a substantially fluid-tight, crimped-edge connection with end 220 of flexible spring member 206.

End member 204 is shown in the exemplary arrangement in FIGS. 2-5 as being of a type commonly referred to as a piston (or a roll-off piston) that has an outer surface 224 that abuttingly engages flexible spring member 206 such that a rolling lobe 226 is formed therealong. As gas spring assembly 200 is displaced between extended and collapsed conditions, rolling lobe 226 can be displaced along outer surface 224 in a conventional manner.

Figure 3:
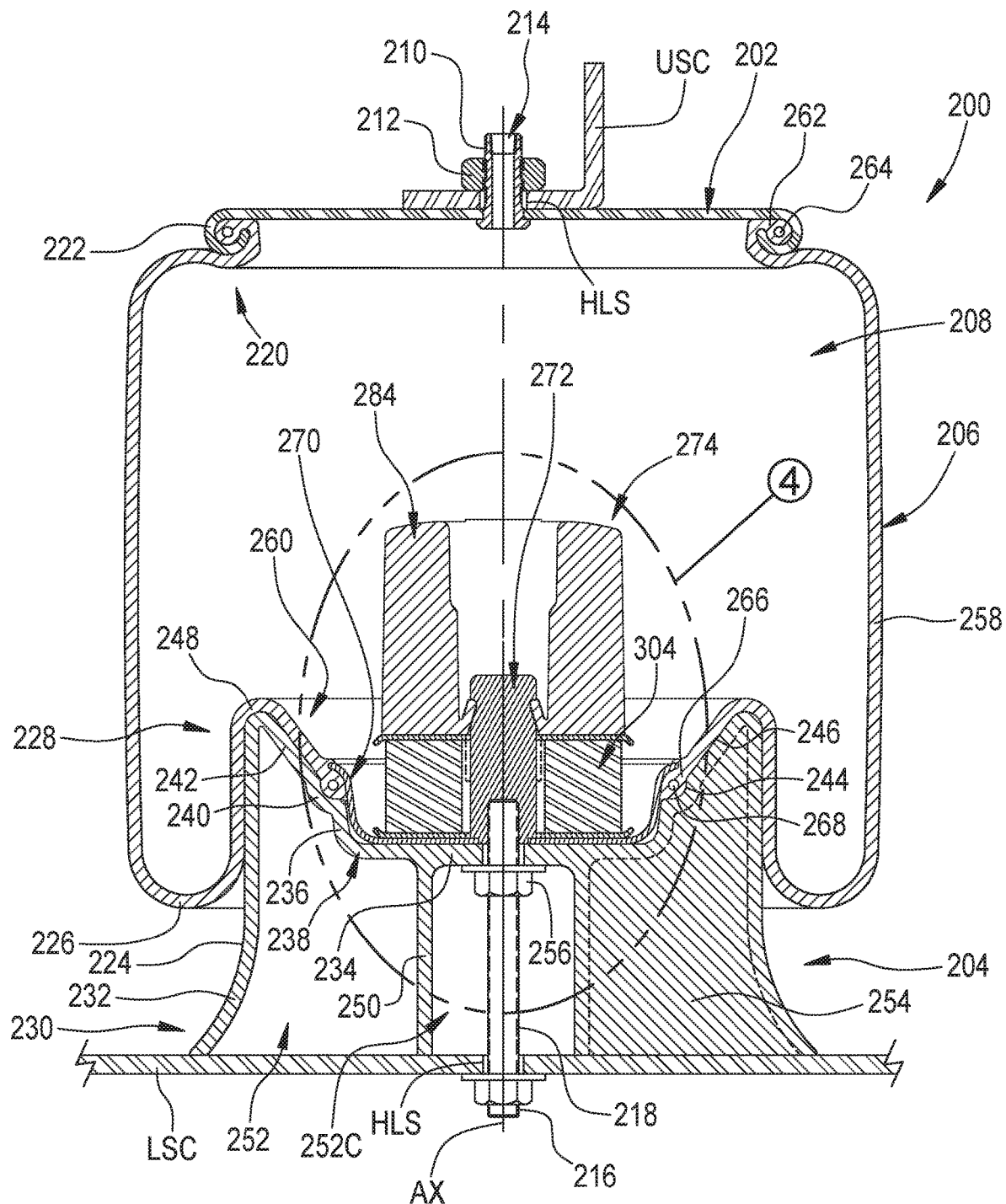
FIG. 3 is a cross-sectional side view of the gas spring assembly shown in FIG. 2 taken from along line 3-3 therein illustrating one example of a jounce bumper assembly in accordance with the subject matter of the present disclosure.

As identified in FIG. 3, end member 204 extends generally between a first or upper end 228 and a second or lower end 230. End member 204 can be formed from any suitable material or combination of materials, and can include any suitable number of one or more components. For example, the end member could be formed from two or more metal parts that are secured together, such as by way of one or more securement devices and/or flowed-material joints, for example. As another example, end member 204 could be at least partially formed from a polymeric material, and can, optionally and in some cases, be molded or otherwise formed as a single, unitary body that includes one or more walls and/or wall portions. In the arrangement in FIGS. 2-5, for example, end member 204 is shown as including an outer side wall (or side wall portion) 232 that extends peripherally about axis AX and generally longitudinally between ends 228 and 230. Outer side wall portion 232 can at least partially define or otherwise include at least a portion of outer surface 224.

End member 204 can also include a base wall (or wall portion) 234 that extends generally transverse to axis AX and can at least partially form a closed end of the end member. Base wall portion 234 can include an inner edge (not numbered) that at least partially defines a hole or opening (not numbered) that can be dimensioned to permit a securement device, such as mounting stud 216, for example, to extend therethrough. In some cases, base wall portion 234 can be directly connected to or otherwise extend directly from the outer side wall portion. In other cases, end member 204 can include one or more walls or wall portions disposed between and operatively connecting the outer side wall portion and the base wall portion. For example, end member 204 can include an inner side wall portion 236 that extends in a generally axial direction from along base wall portion 234. Together with the base wall portion, the inner side wall portion can at least partially define a recess 238 extending into end member 204 and dimensioned to receive at least a portion of an associated end closure, such as will be described hereinafter.

End member 204 can also include end walls (or end wall portions) 240 and/or 242 that extend between inner and outer side wall portions 236 and 232. In the arrangement shown in FIGS. 3-5, end wall portions 240 and 242 have a generally linear cross-sectional shape and are disposed at different acute angles relative to axis AX such that the end of wall portions respectively form end surfaces 244 and 246 that have different shapes or profiles. It will be appreciated, however, that wall portions having other cross-sectional shapes and/or configurations could alternately be used. As a further example, end member 204 can include a shoulder wall (or shoulder wall portion) 248 that has a curved cross-sectional shape and transitions between outer side wall portion 232 and one or more of end wall portion 242, end wall portion 240, inner side wall portion 236 and/or base wall portion 234.

In some cases, end member 204 can include one or more additional walls or wall portions, such as may provide added structure, support and/or rigidity to the end member. For example, end member 204 can include a central support wall (or wall portion) 250 extending peripherally about axis AX and axially from along base wall portion 234 in a direction toward end 230. End member 204 can include an outer cavity 252 formed between outer side wall portion 232 and central support wall portion 250 that extends into the end member from along end 230. End member 204 can also, optionally, include a plurality of support walls (or support wall portions) 254 disposed in peripherally-spaced relation to one another about axis AX. The plurality of support walls can separate outer cavity 252 into a plurality of chambers (not shown). End member 204 can also include a central cavity 252C that is at least partially defined by central support wall 250 and can be dimensioned to receive one or more securement features, such as mounting stud 216 and/or a threaded nut 256 received therealong, for example.

Flexible spring member 206 can include a flexible wall 258 that can extend between first end 220 and a second end 260. It will be appreciated that flexible spring member 206 and flexible wall 258 thereof can be formed in any suitable manner and from any suitable material or combination of materials, such as by using one or more filament-reinforced, elastomeric plies or layers and/or one or more un-reinforced, elastomeric plies or layers, for example. Typically, one or more filament-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

It will be appreciated that end members 202 and 204 can be operatively connected to first and second ends 220 and 260 in any suitable manner. As such, flexible spring member 206 and flexible wall 258 thereof can include any suitable combination of one or more features on or along the first and/or second ends that may be suitable for facilitating such operative connections. As one example, flexible spring member 206 can include a mounting bead 262 disposed along end 220. Mounting bead 262 can extend peripherally around end 220 and can, optionally, include a bead reinforcement element 264, such as an endless, annular wire, for example. During assembly, outer peripheral portion 222 of the end member can be controllably deformed (e.g., crimped, swaged, pressed) into abutting engagement with flexible wall 206 such that mounting bead 262 is at least partially captured by the outer peripheral portion to form a crimped-edge connection with end member 202.

As another example, flexible spring member 206 can include a mounting bead 266 disposed along end 260. Mounting bead 266 can extend peripherally around end 260 and can, optionally, include a bead reinforcement element 268, such as an endless, annular wire, for example. In a preferred arrangement, flexible spring member 206 at least partially defines an opening (not numbered) along end 260 that is dimensioned to receivingly engage a surface, wall and/or wall portion of an end closure 270 such that a substantially fluid-tight connection can be formed with the end closure in a suitable manner, such as by way of a permanent connection or joint (i.e., inseparable without damage, destruction or material alteration of at least one of the component parts) between the second end of the flexible spring member and the end closure.

In this exemplary manner, second end 260 of flexible spring member 206 can be secured on or along upper end 228 of end member 204 using end closure 270. It will be appreciated that the end closure can be secured on or along end member 204 in any suitable manner. In the exemplary embodiment shown, a bumper mount or bumper mounting nut 272 is threadably secured on mounting stud 216 and engages end closure 270. By securing mounting stud 216 on end member 204, such as by using threaded nut 256, for example, the end closure can be drawn tight to upper end 228 to thereby secure end closure 270 on or along end member 204. It is to be understood, however, that the arrangement shown and described is merely exemplary and that any other suitable construction and/or configuration can alternately be used.

A jounce bumper assembly 274 in accordance with the subject matter of the present disclosure can be supported within spring chamber 208, such as to inhibit direct contact between end members 202 and 204, for example. It will be appreciated that the jounce bumper assembly can be supported on or along an end member in any suitable manner. For example, jounce bumper assembly 274 is shown as being operatively disposed along end member 204 and operatively secured therealong through engagement with bumper mounting nut 272. In a preferred arrangement, bumper mounting nut 272 can include a proximal end (not numbered) secured on or along end closure 270 in a substantially fluid-tight manner, such as by way of a flowed material joint 276, for example. Bumper mounting nut 272 can extend from the proximal end toward a distal end 278 disposed in spaced relation to the end closure 270.

Figure 4:
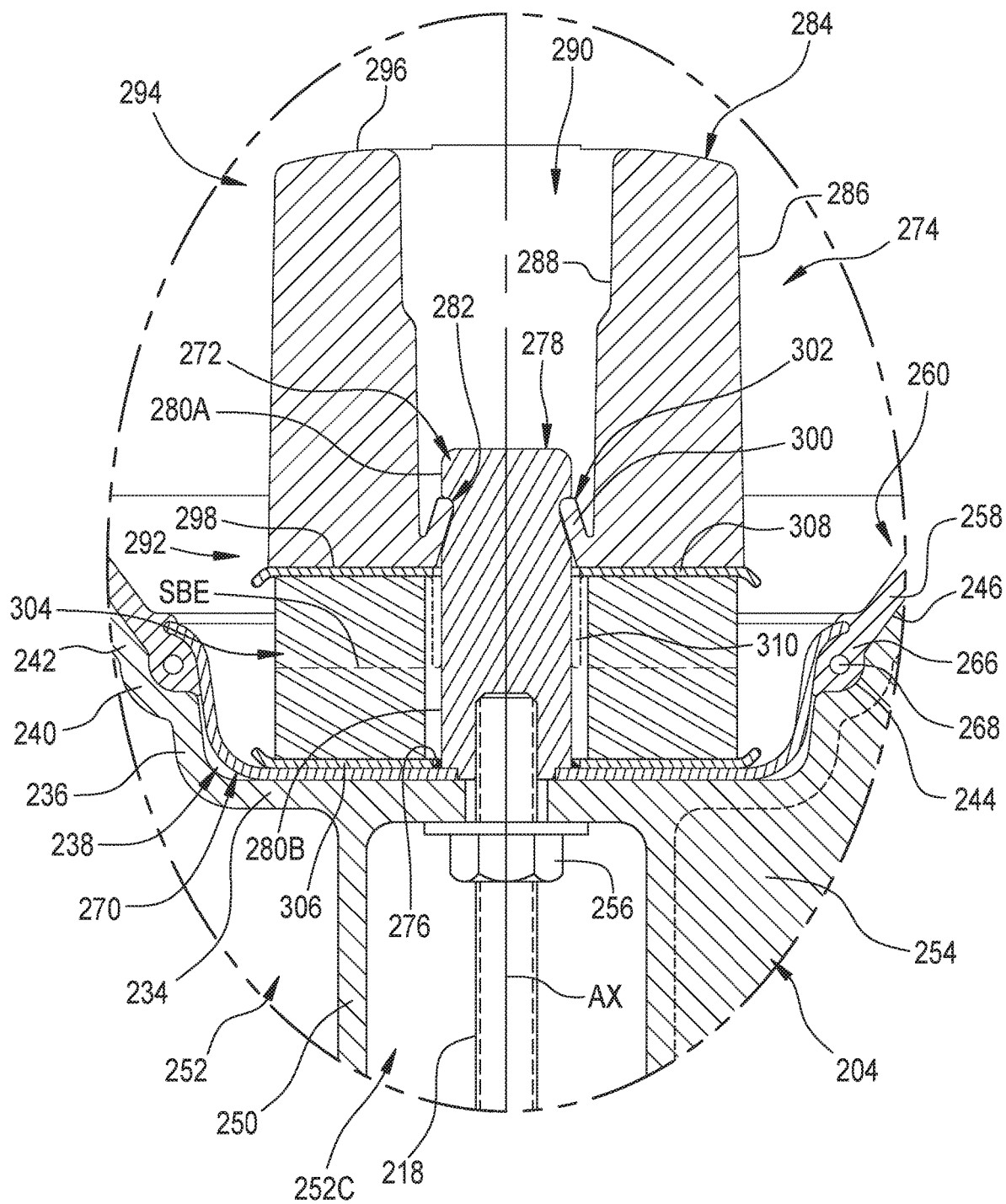
FIG. 4 is an enlarged, cross-sectional view of the exemplary jounce bumper assembly in FIGS. 2 and 3 identified as Detail 4 in FIG. 3.
Figure 5:
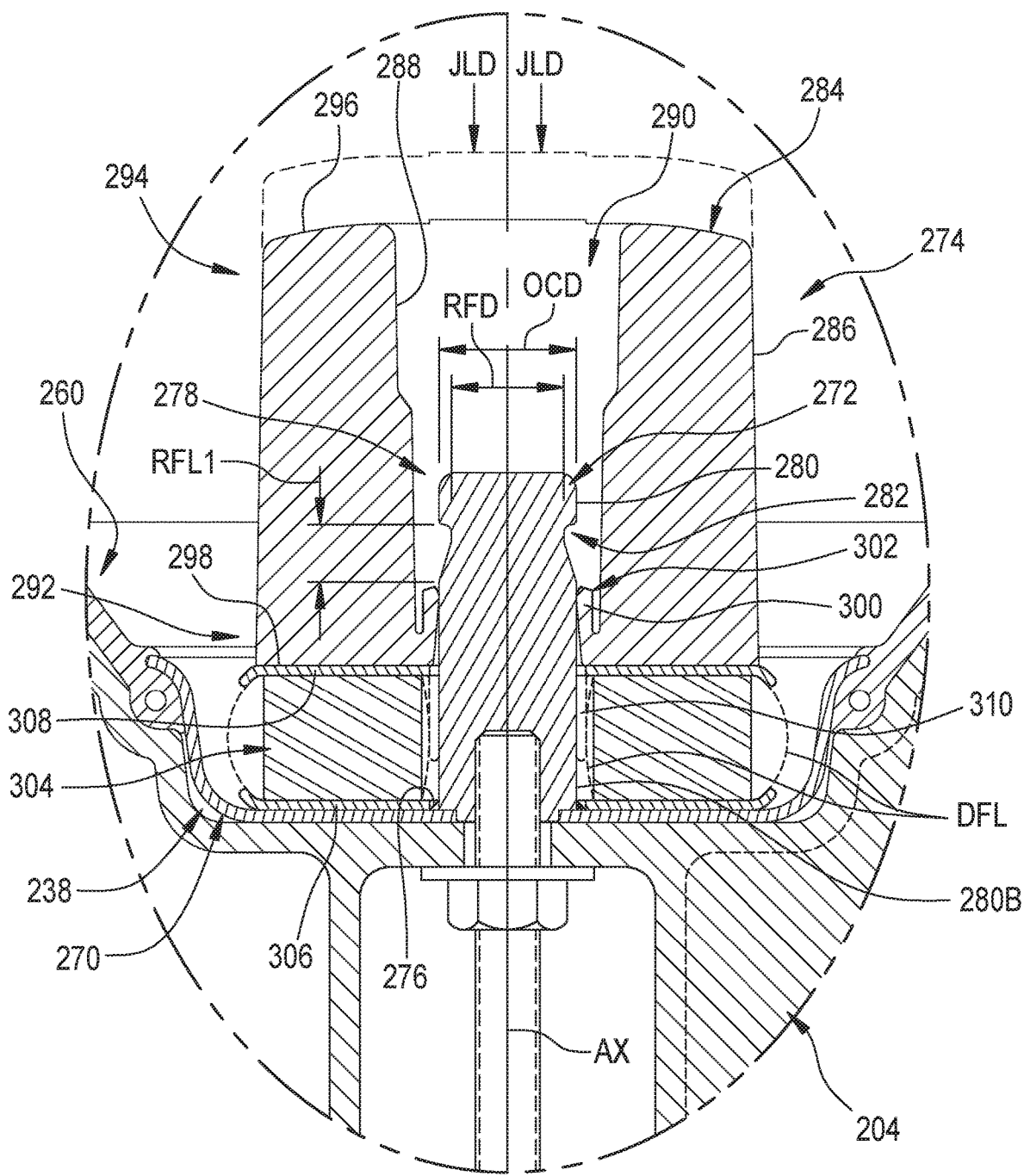
FIG. 5 illustrates the exemplary jounce bumper assembly shown in FIGS. 3 and 4 undergoing a jounce load condition.

Bumper mounting nut 272 can include one or more outer shaft-like sections, such as, for example, sections 280A and 280B that are respectively shown as being disposed toward the distal and proximal ends of the bumper mounting nut. Bumper mounting nut 272 can also include one or more bumper retaining features disposed therealong between the distal and proximal ends. As shown in FIG. 5, bumper mounting nut 272 can include an outer cross-sectional dimension OCD disposed along one or more of sections 280A and/or 280B. The one or more bumper retaining features can extend radially inward into the bumper mounting nut to at least partially define a retaining-feature cross-sectional dimension RFD disposed axially between sections 280A and 280B that is less than outer cross-sectional dimension OCD. In some cases, bumper mounting nut 272 can include a bumper retaining feature 282 having a size, shape and configuration of an annular recess or groove that extends radially inward into the bumper mounting nut adjacent distal end 278, such as is shown in FIGS. 3-5, for example. In such an arrangement, bumper retaining feature 282 can have a conventional cross-sectional profile or shape with a retaining feature length RFL1 that is approximately 50 percent or less of retaining-feature cross-sectional dimension RFD.

Figure 6:
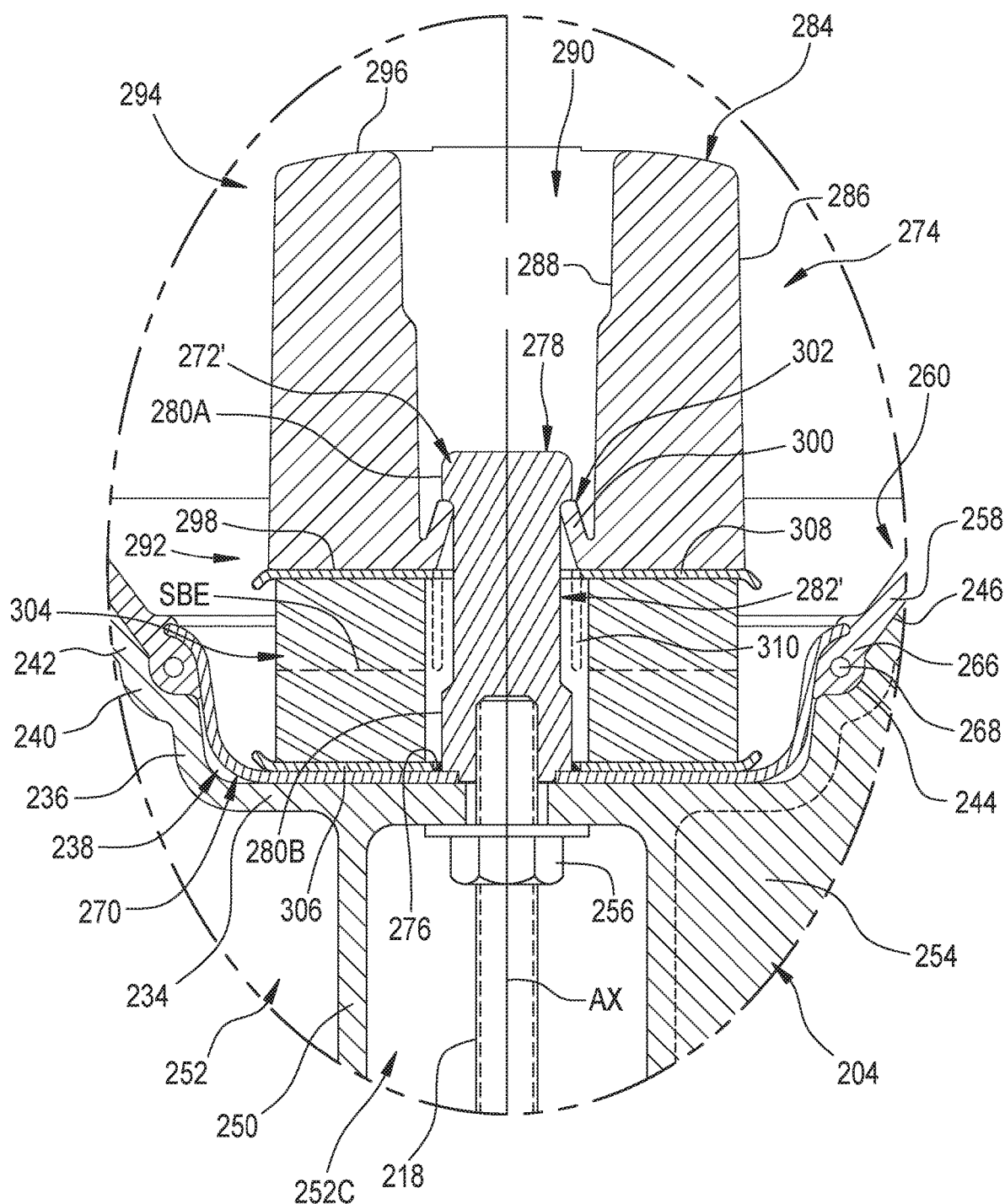
FIG. 6 is an enlarged, cross-sectional view of the jounce bumper assembly shown in FIGS. 3-5 illustrating an alternate construction of a bumper mount.
Figure 6A:
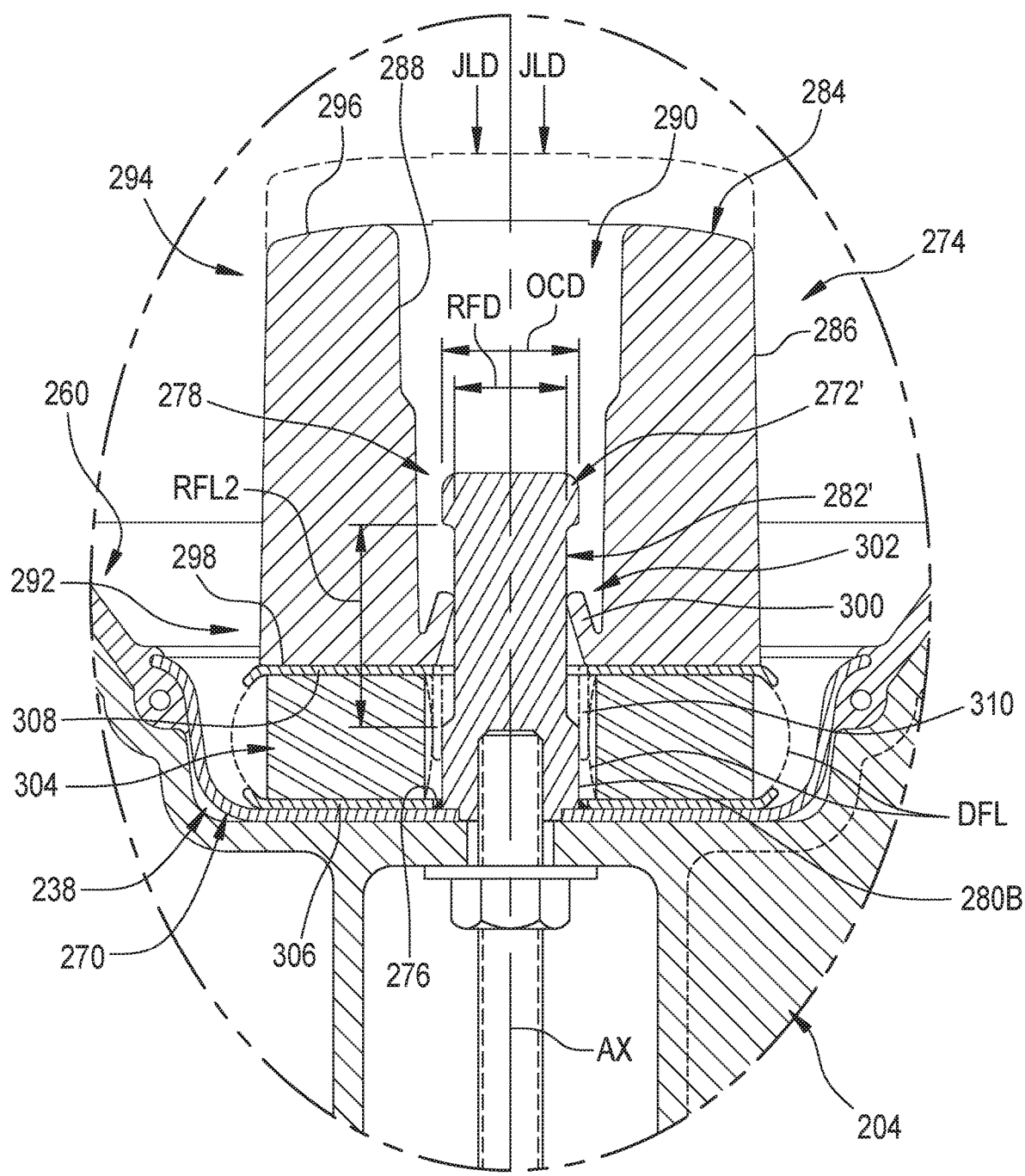
FIG. 6A illustrates the exemplary jounce bumper assembly in FIG. 6 undergoing a jounce load condition.

As another exemplary construction, a bumper mounting nut 272' can include a bumper retaining feature 282', such as is shown in FIGS. 6 and 6A, for example. Bumper retaining feature 282' can have a size, shape and configuration of an elongated shaft section with a retaining feature length RFL2 that is approximately 75 percent or greater than retaining-feature cross-sectional dimension RFD. In some cases, retaining feature length RFL2 can be approximately 125 percent or greater than retaining-feature cross-sectional dimension RFD. The elongated shaft section of bumper retaining feature 282' can have an approximately cylindrical outer surface (not numbered) that extends in a continuous or discontinuous manner along a majority of retaining feature length RFL2. Bumper mounting nut 272' with bumper retaining feature 282' is shown in FIGS. 6, 6A, 7A, 8A, 9A and can, optionally, be used as an alternate construction to bumper mounting nut 272 with retaining feature 282.

Jounce bumper assembly 274 can include a jounce bumper 284 that includes an outer surface portion 286, an inner surface portion 288 that at least partially defines an inner passage 290 extending through the jounce bumper between a proximal end 292 and a distal end 294. Jounce bumper 284 can also include a distal surface portion 296 disposed along distal end 294 that is dimensioned for abutting engagement with an opposing end member or other structure, and a base surface portion 298 that is disposed along proximal end 292 in facing relation to end closure 270. A plurality of retaining projections 300 can extend axially and radially inward, such as from along proximal end 292, and axially toward projection ends 302 that are dimensioned to abuttingly engage a bumper retaining feature, such as one of features 282 and 282', for example, of corresponding bumper mounting nut 272 or 272' to thereby retain the jounce bumper assembly on or along the bumper mounting nut. In some cases, retaining projections 300 can take the form of individual elements that are disposed in spaced relation to one another about axis AX and that are biased radially inward. In this manner, the plurality of retaining projections can operatively engage the bumper retaining feature (e.g., one of features 282 and 282') and, thus, can be operative to inhibit displacement of jounce bumper 284 in a direction away from end closure 270 beyond an extended position, such as is shown in FIGS. 3, and 6. In some cases, such a configuration will permit jounce bumper 284 to be displaced along shaft-like sections 280 of the bumper mounting nut in a direction toward end closure 270, such as may result from the jounce bumper assembly experiencing a jounce load condition, as is represented in FIGS. 5 and 6A by arrows JLD, for example. In cases in which bumper retaining feature 282' is included, jounce bumper 284 can be displaced axially along bumper mounting nut 272' while beneficially allowing retaining projections 300 to remain in an inwardly biased position, such as is shown in FIG. 6A. Whereas, the use of bumper retaining feature 282 can result in retaining projections 300 being deflected outward as jounce bumper 284 is displace axially toward end closure 270, such as is shown in FIG. 5, for example.

Jounce bumper assembly 274 can also include one or more biasing elements disposed between end closure 270 and jounce bumper 284 that are operative to bias or otherwise urge the jounce bumper in a direction away from the end closure. In such a construction, the one or more biasing elements can displace jounce bumper 284 from a compressed position shown in FIGS. 5 and 6A toward the extended position shown in FIGS. 3, 4 and 6 upon abatement of the jounce load condition represented by arrows JLD. In such case, the jounce bumper can travel axially along bumper mounting nut 272 or 272' until retaining projections 300 engage either bumper retaining feature 282 or a distal end (not numbered) of bumper retaining feature 282' thereby inhibiting further axial travel of jounce bumper 284 along the bumper mounting nut in the axial direction away from end closure 270.

It will be appreciated that the one or more biasing elements can be operatively engaged with the jounce bumper and/or the end closure in any suitable manner. Additionally, in some cases, the one or more biasing elements can be configured, constructed and/or otherwise arranged to have sufficient rigidity and column strength to be self-supporting. In some cases, however, one or more features and/or elements can be included that operatively engage the one or more biasing elements with, on and/or along end closure 270, bumper mounting nut 272, bumper mounting nut 272' and/or jounce bumper 284. As one example, a biasing element 304 is shown in FIGS. 3-6 and 6A as being disposed between end closure 270 and jounce bumper 284. In some cases, the biasing element can be disposed in abutting engagement with the end closure and/or the jounce bumper, such as is shown in FIGS. 7, 7A, 8, 8A, 9 and 9A, for example. In other cases, however, one or more biasing element retainers can be included, such as are shown in FIGS. 3-6 and 6A, for example. As shown therein, a retainer 306 can be disposed between biasing element 304 and end closure 270. Additionally, or in the alternative, a retainer 308 can be disposed between biasing element 304 and base surface portion 298 of jounce bumper 284. In some cases, one or more of retainers 306 and/or 308, if included, can optionally include an inner guide wall portion 310 that extends axially along a portion of bumper mounting nut 272 or 272', such as along one or more of outer shaft-like sections 280A and 280B and/or along an elongated shaft section of bumper retaining feature 282' for example.

Figure 7:
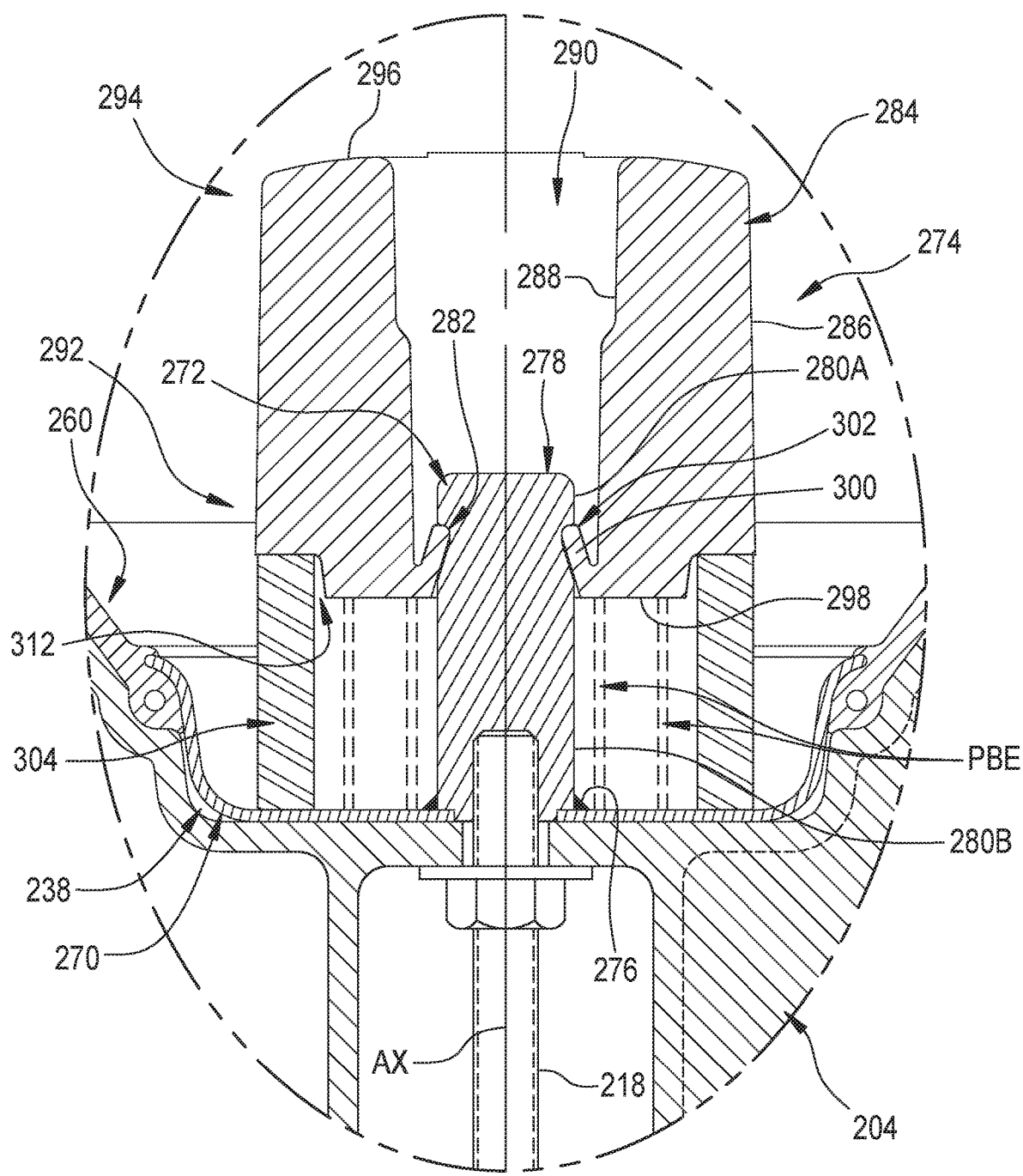
FIG. 7 illustrates another example of a jounce bumper assembly in accordance with the subject matter of the present disclosure.
Figure 7A:
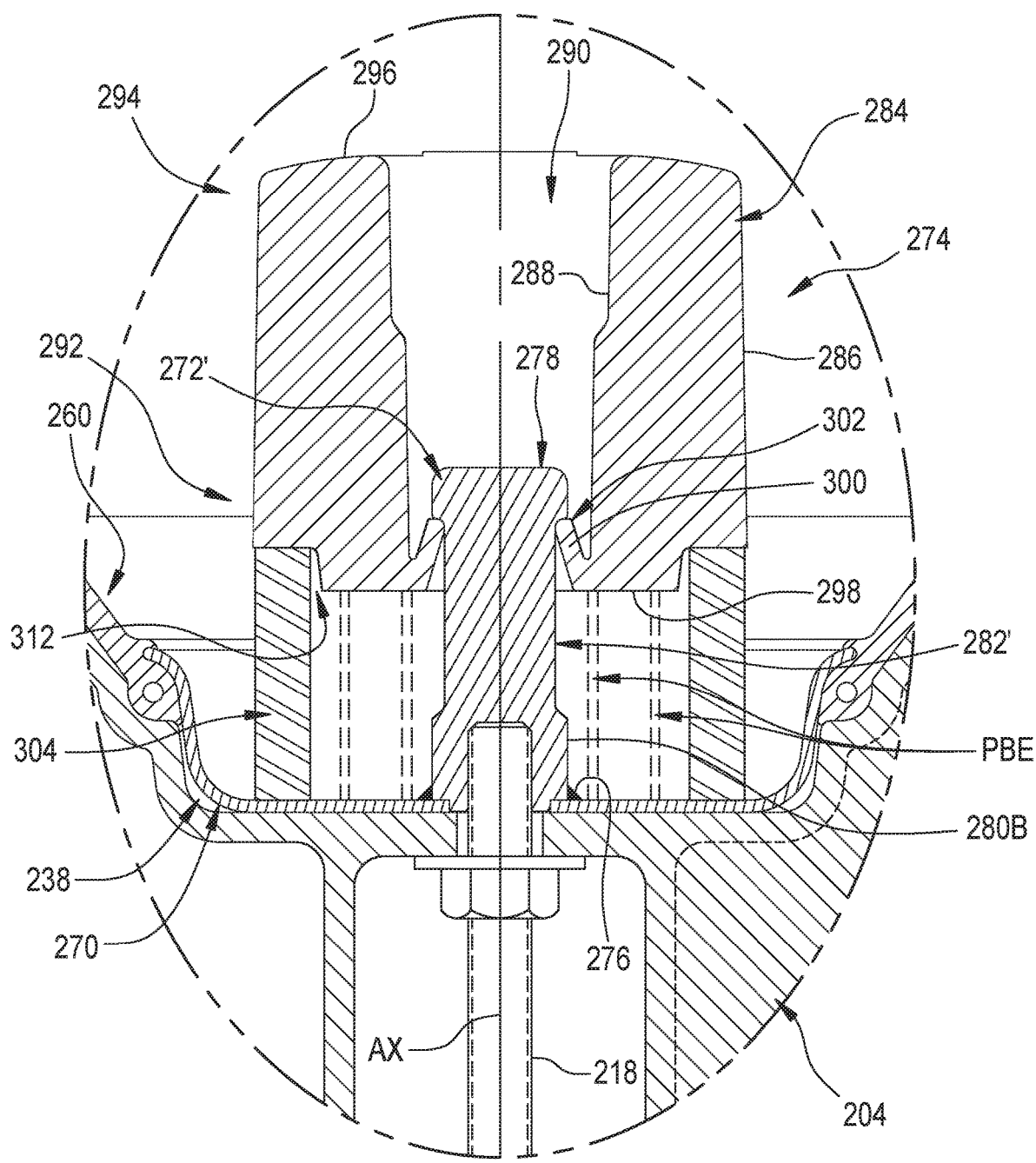
FIG. 7A illustrates the exemplary jounce bumper assembly in FIG. 7 including the alternate bumper mount of FIGS. 6 and 6A.
Figure 8:
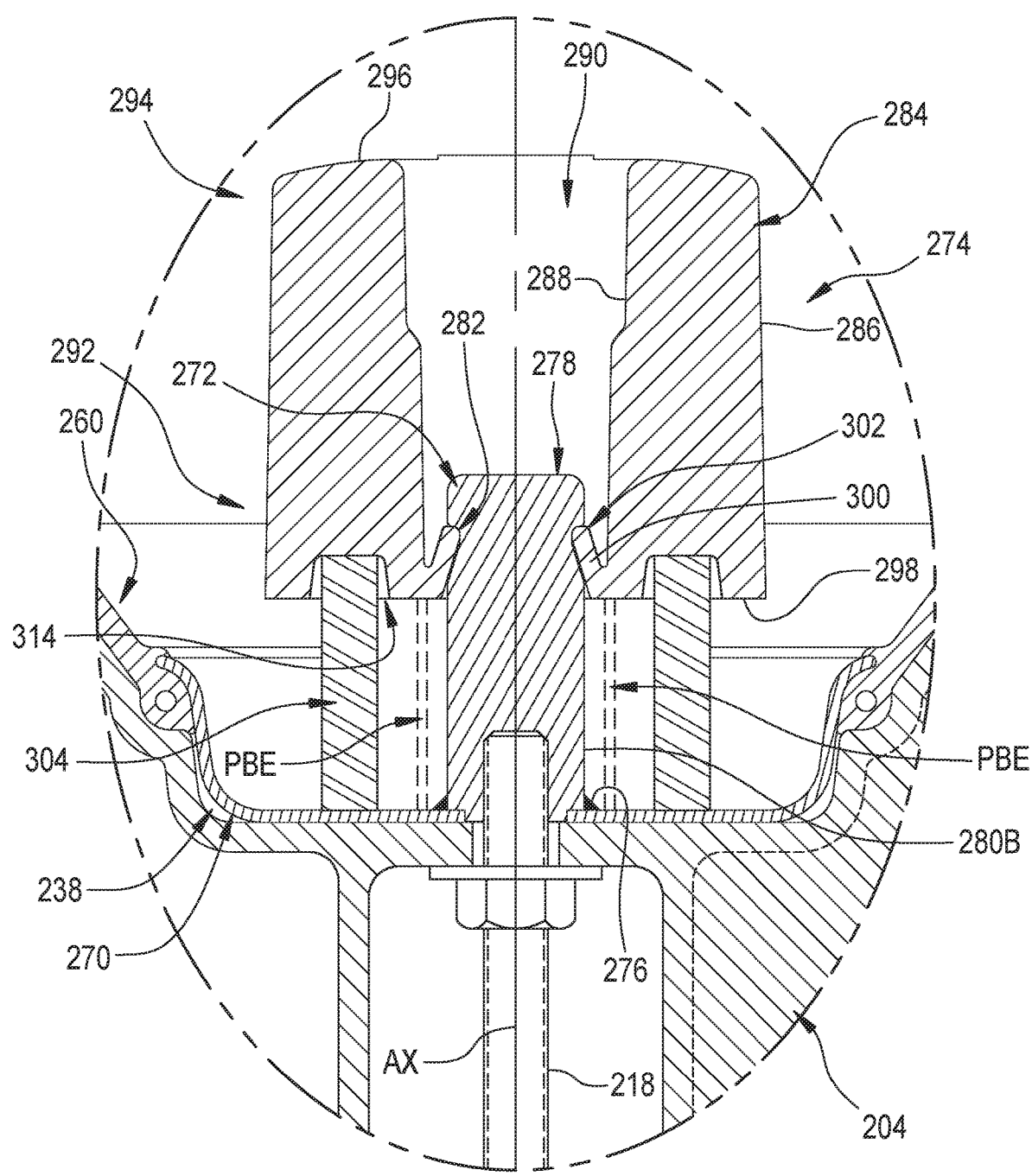
FIG. 8 illustrates still another example of a jounce bumper assembly in accordance with the subject matter of the present disclosure.
Figure 8A:
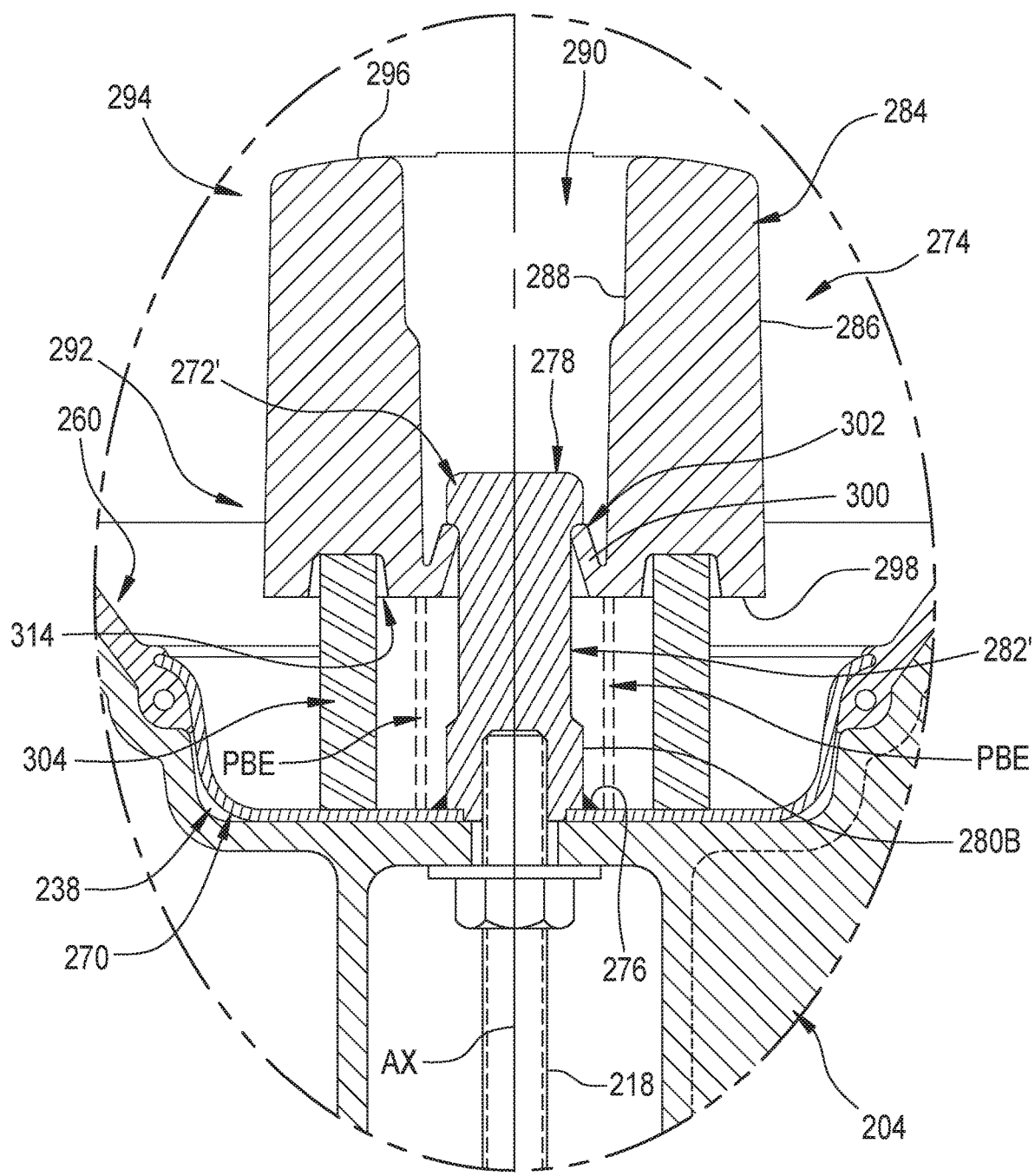
FIG. 8A illustrates the exemplary jounce bumper assembly in FIG. 8 including the alternate bumper mount of FIGS. 6 and 6A.
Figure 9:
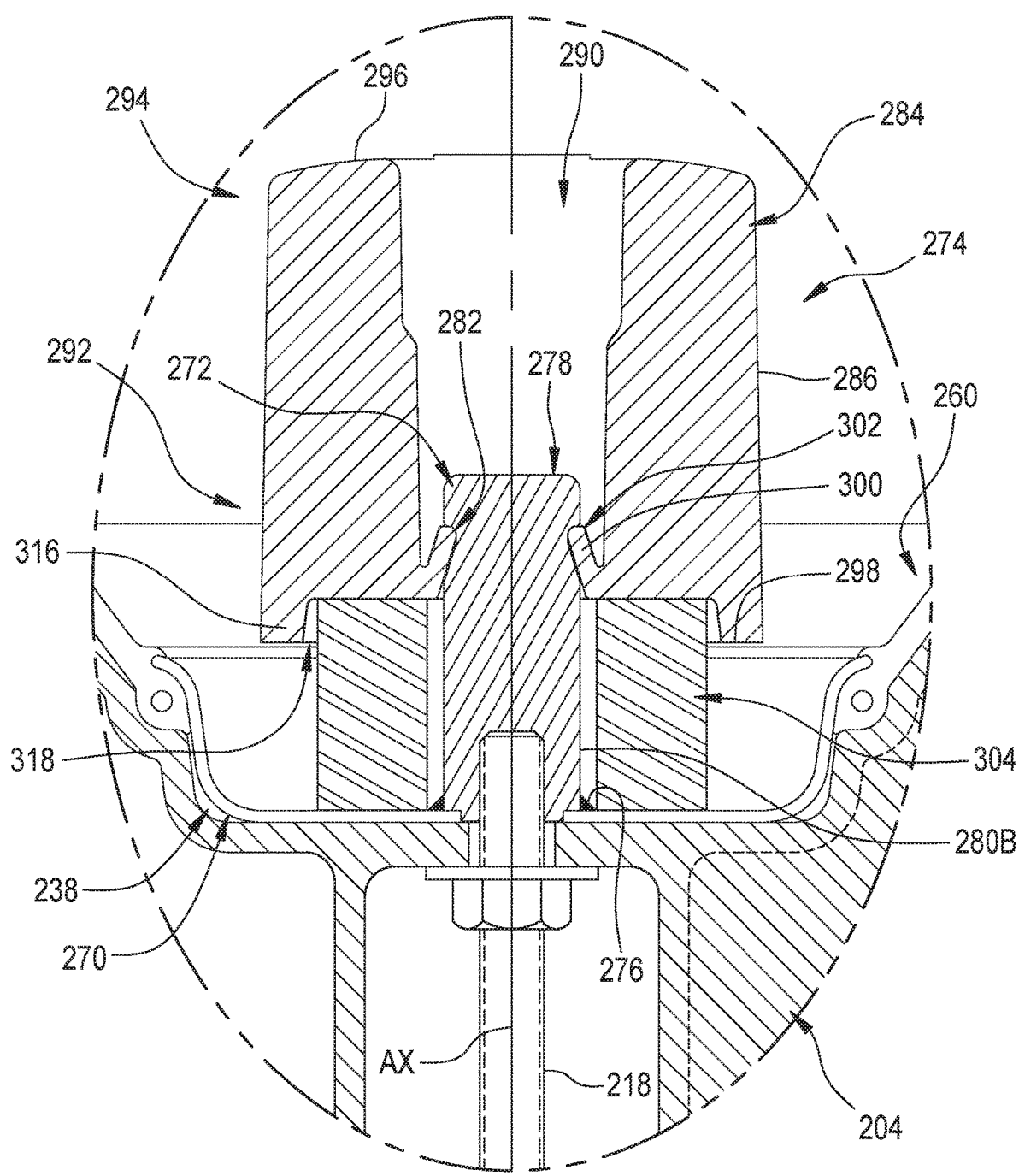
FIG. 9 illustrates a further example of a jounce bumper assembly in accordance with the subject matter of the present disclosure.
Figure 9A:
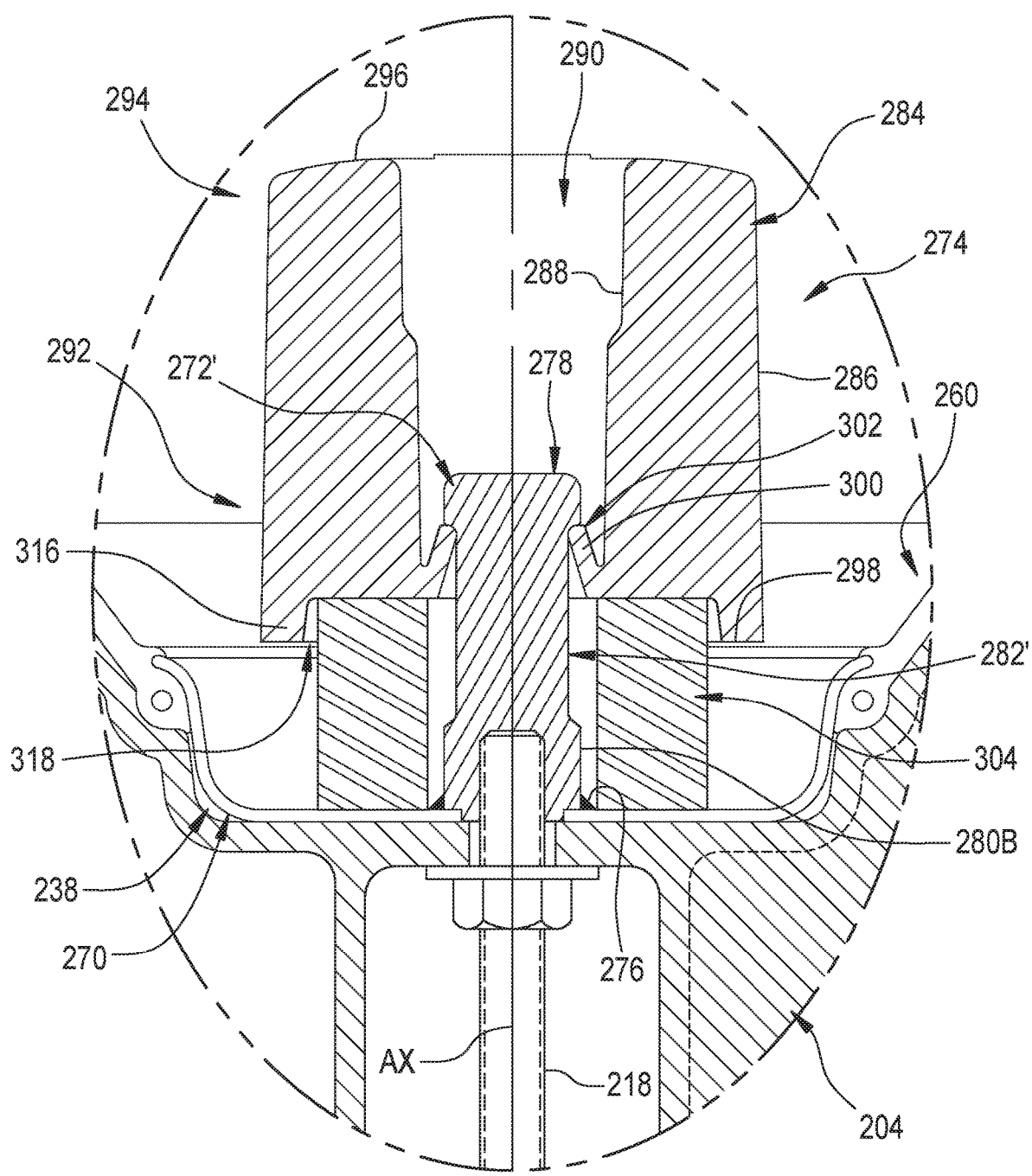
FIG. 9A illustrates the exemplary jounce bumper assembly in FIG. 9 including the alternate bumper mount of FIGS. 6 and 6A.

Alternate arrangements of jounce bumper assembly 274 are shown in FIGS. 7 and 7A in which jounce bumper 284 includes an annular recess or groove 312 formed along outer surface portion 286 and base surface portion 298 of jounce bumper 284 along proximal end 292 thereof. In such an arrangement, biasing element 304 can be dimensioned to be at least partially received within groove 312. Additional alternate arrangements are shown in FIGS. 8 and 8A in which jounce bumper 284 includes an annular recess or groove 314 that extends axially into the jounce bumper from along base surface portion 298. In such an arrangement, biasing element 304 is at least partially received within groove 314 such that the biasing element is radially captured between within jounce bumper 284. Still other alternate arrangements are shown in FIGS. 9 and 9A in which jounce bumper 284 includes an annular projection or rim 316 that extends axially outwardly beyond base surface portion 298 to form a recess or cavity 318 along proximal end 292 of the jounce bumper. In such an arrangement, biasing element 304 can be at least partially received within cavity 318 such that annular projection 316 is disposed radially outward of the jounce bumper.

It will be appreciated that the one or more biasing elements shown and described in connection with any of the foregoing embodiments can be of any suitable type, kind and/or construction. Non-limiting examples of suitable biasing elements can include one or more wave springs, one or more conical disk springs, one or more coil springs and/or one or more polymeric spring bodies, such as may be formed from an elastomeric material (e.g., closed cell foam), for example. The one or more biasing elements will each have a spring rate and, in a preferred arrangement, can have a solid height in a fully compressed condition. In some cases, the one or more biasing elements can deflect radially inward and/or outward, such as is represented in FIGS. 5 and 6A by dashed lines DFL, for example. In some cases, two or more biasing elements can be operatively arranged in series with one another, such as is represented in FIGS. 4 and 6 by dashed line SBE. In other cases, the two or more biasing elements can be operatively arranged in parallel with one another, such as is represented in FIGS. 7A, 8 and 8A by dashed lines PBE. In either of such configurations, the two or more biasing elements can, in some cases, have a common spring rate. Alternately, the two or more biasing elements can have differing stiffnesses or spring rates, such as may be useful to provide desired load-deflection performance characteristics, for example.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation.

Furthermore, the phrase "flowed-material joint" and the like are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, terms such as "gas," "pneumatic" and "fluid" as well as variants thereof, are used herein to broadly refer to and include any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment is specifically shown and described as including all such features and components. However, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein and whether or not initially presented in herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations insofar as they come within the scope of the appended claims and any equivalents thereof.

The invention claimed is:

1. A jounce bumper assembly dimensioned for securement on or along an associated end member for an associated gas spring assembly, said jounce bumper assembly comprising:
 a bumper mount dimensioned for securement to the associated end member;
 a jounce bumper supported on said bumper mount for axial displacement therealong; and,
 a plurality of biasing elements disposed peripherally about said bumper mount with a first one of said plurality of biasing elements having a first spring rate and a second one of said plurality of biasing elements having a second spring rate that is different from said first spring rate, said plurality of biasing elements arranged in series with one another and positioned axially between said jounce bumper and the associated end member, said plurality of biasing elements having a fully-compressed, solid height that is operative to maintain said jounce bumper assembly in axially-spaced relation to the associated end member under a full jounce load condition.

2. A jounce bumper assembly according to claim 1, wherein said plurality of biasing elements include one of a wave spring, a conical disk spring, a coil spring and a polymeric spring body.

3. A gas spring assembly comprising:
 a flexible spring member having a longitudinal axis and including a flexible wall extending peripherally about said longitudinal axis, said flexible spring member extending longitudinally between opposing first and second ends and at least partially defining a spring chamber therebetween;
 a first end member secured across said first end of said flexible spring member such that a substantially fluid-tight seal is formed therebetween;
 a second end member secured across said second end of said flexible spring member such that a substantially fluid-tight seal is formed therebetween; and,
 a jounce bumper assembly disposed within said spring chamber and secured to one of said first and second end members and dimensioned to abuttingly engage the other of said first and second end members during use of said gas spring assembly under jounce load conditions, said jounce bumper assembly including:
  a bumper mount dimensioned for securement to said one of said first and second end members, said bumper mount extending axially between a proximal end and a distal end and including an outer cross-sectional dimension with a bumper retaining feature disposed along said bumper mount between said proximal and distal ends, said bumper retaining feature extending radially into said bumper mount and having a retaining feature cross-sectional dimension that is less than said outer cross-sectional dimension of said bumper mount with a length that is at least 75 percent of said retaining feature cross-sectional dimension;
  a jounce bumper supported on said bumper mount for axial displacement therealong, said jounce bumper including an inner side wall portion at least partially defining a passage into said jounce bumper and a plurality of retaining projections extending radially inward into said passage with said plurality of retaining projections extending into said bumper retaining feature and engaging said bumper mount in a first radially-biased condition; and,
  a biasing element disposed peripherally about said bumper mount and positioned axially between said jounce bumper and said one of said first and second end members, said biasing element having a fully-compressed, solid height that is operative to maintain said jounce bumper assembly in axially-spaced relation to said one of said first and second end members under a full jounce load condition.

4. A gas spring assembly according to claim 3, wherein said biasing element urges said jounce bumper toward said distal end of said bumper mount.

5. A gas spring assembly according to claim 4, wherein said jounce bumper includes an outer side wall portion disposed radially outward of said inner side wall portion and an end surface oriented in facing relation to said one of said first and second end members with said plurality of retaining projections extending radially inward into said passage from along said inner side wall portion and operatively engaging said bumper retaining feature to limit axial displacement of said jounce bumper along said bumper mount in a first direction moving away from said one of said first and second end members.

6. A gas spring assembly according to claim 3, wherein said length of said bumper retaining feature permits displacement of said jounce bumper toward said one of said first and second end members while retaining said plurality of retaining projections in approximately said first radially-biased condition.

7. A gas spring assembly according to claim 3, wherein said bumper retaining feature has a length that is at least 125 percent of said retaining feature cross-sectional dimension.

8. A gas spring assembly according to claim 3, wherein said biasing element is one of a plurality of biasing elements with said plurality of biasing elements operatively arranged in series with one another.

9. A suspension system comprising:
a pressurized gas system including a pressurized gas source and a control device; and,
at least one gas spring assembly according to claim 3 disposed in fluid communication with said pressurized gas source through said control device such that pressurized gas can be selectively transferred into and out of said spring chamber of said at least one gas spring assembly.

10. A gas spring assembly comprising:
a flexible spring member having a longitudinal axis and including a flexible wall extending peripherally about said longitudinal axis, said flexible spring member extending longitudinally between opposing first and second ends and at least partially defining a spring chamber therebetween;
a first end member secured across said first end of said flexible spring member such that a substantially fluid-tight seal is formed therebetween;
a second end member secured across said second end of said flexible spring member such that a substantially fluid-tight seal is formed therebetween; and,
a jounce bumper assembly disposed within said spring chamber and secured to one of said first and second end members and dimensioned to abuttingly engage the other of said first and second end members during use of said gas spring assembly under jounce load conditions, said jounce bumper assembly including:
a bumper mount secured to said one of said first and second end members, said bumper mount extending axially between a proximal end and a distal end and having an outer cross-sectional dimension, said bumper mount including a bumper retaining feature disposed therealong between said proximal and distal ends, said bumper retaining feature extending radially into said bumper mount such that said bumper retaining feature has a retaining feature cross-sectional dimension that is less than said outer cross-sectional dimension of said bumper mount with said bumper retaining feature having a length that is at least 75 percent of said retaining feature cross-sectional dimension;
a jounce bumper supported on said bumper mount for axial displacement therealong, said jounce bumper including an outer side wall portion, an inner side wall portion disposed radially inward of said outer side wall portion and at least partially defining a passage into said jounce bumper, an end surface oriented in facing relation to said one of said first and second end members, and a plurality of retaining projections extending radially inward into said passage from along said inner side wall portion with said plurality of retaining projections extending into said bumper retaining feature and operatively engaging said bumper mount in a first radially-biased condition such that said jounce bumper is displaceable toward said one of said first and second end members while said plurality of retaining projections remain in approximately said first radially-biased condition during displacement along said length of said bumper retaining feature; and,
a biasing element disposed peripherally about said bumper mount and positioned axially between said jounce bumper and said one of said first and second end members, said biasing element having a fully-compressed, solid height that is operative to maintain said jounce bumper assembly in axially-spaced relation to said one of said first and second end members under a full jounce load condition.

11. A gas spring assembly according to claim 10, wherein said biasing element includes one of a wave spring, a conical disk spring, a coil spring and a polymeric spring body.

12. A gas spring assembly according to claim 10, wherein said biasing element is one of a plurality of biasing elements with said plurality of biasing elements operatively arranged in series with one another.

13. A gas spring assembly according to claim 12, wherein a first one of said plurality of biasing elements has a first spring rate and a second one of said plurality of biasing elements has a second spring rate that is different from said first spring rate.

14. A gas spring assembly according to claim 8, wherein a first one of said plurality of biasing elements has a first spring rate and a second one of said plurality of biasing elements has a second spring rate that is different from said first spring rate.

15. A gas spring assembly according to claim 3, wherein said biasing element includes one of a wave spring, a conical disk spring, a coil spring and a polymeric spring body.

16. A jounce bumper assembly dimensioned for securement on or along an associated end member for an associated gas spring assembly, said jounce bumper assembly comprising:
a bumper mount dimensioned for securement to the associated end member, said bumper mount extending axially between a proximal end and a distal end and including an outer cross-sectional dimension with a bumper retaining feature disposed along said bumper mount between said proximal and distal ends, said bumper retaining feature extending radially into said bumper mount and having a retaining feature cross-sectional dimension that is less than said outer cross-sectional dimension of said bumper mount with a length that is at least 75 percent of said retaining feature cross-sectional dimension;

a jounce bumper supported on said bumper mount for axial displacement therealong, said jounce bumper including an inner side wall portion at least partially defining a passage into said jounce bumper and a plurality of retaining projections extending radially inward into said passage with said plurality of retaining projections extending into said bumper retaining feature and engaging said bumper mount in a first radially-biased condition such that said jounce bumper is displaceable toward the associated end member while said plurality of retaining projections remain in approximately said first radially-biased condition during displacement along said length of said bumper retaining feature; and, a biasing element disposed peripherally about said bumper mount and positioned axially between said jounce bumper and the associated end member, said biasing element having a fully-compressed, solid height that is operative to maintain said jounce bumper assembly in axially-spaced relation to the associated end member under a full jounce load condition.

17. A jounce bumper assembly according to claim 16, wherein said biasing element urges said jounce bumper toward said distal end of said bumper mount.

18. A jounce bumper assembly according to claim 16, wherein said jounce bumper includes an outer side wall portion disposed radially outward of said inner side wall portion and an end surface oriented in facing relation to said one of said first and second end members with said plurality of retaining projections extending radially inward into said passage from along said inner side wall portion and operatively engaging said bumper retaining feature to limit axial displacement of said jounce bumper along said bumper mount in a first direction moving away from said one of said first and second end members.

19. A jounce bumper assembly according to claim 16, wherein said length of said bumper retaining feature permits displacement of said jounce bumper toward said one of said first and second end members while retaining said plurality of retaining projections in approximately said first radially-biased condition.

20. A jounce bumper assembly according to claim 16, wherein said bumper retaining feature has a length that is at least 125 percent of said retaining feature cross-sectional dimension.

* * * * *